Nov. 3, 1970 — R. R. REDDY — 3,537,731

SEAL FOR A TUBING JOINT

Filed May 23, 1969

INVENTOR.
ROBERT R. REDDY
BY
ATTORNEYS.

United States Patent Office 3,537,731
Patented Nov. 3, 1970

3,537,731
SEAL FOR A TUBING JOINT
Robert R. Reddy, 1195 Michillinda Blvd.,
Pasadena, Calif. 91107
Filed May 23, 1969, Ser. No. 827,413
Int. Cl. F16l 17/00
U.S. Cl. 285—110                                      6 Claims

ABSTRACT OF THE DISCLOSURE

A seal for a tubing joint between two bodies having abutting surfaces that extend peripherally around a pair of joined passages. The seal is made against a differential pressure from a region of higher to a region of lower pressure, one of the regions being inside the passages, and the other being outside of the bodies. A ring groove is formed in one of the abutting surfaces and is defined by a base face intersecting at an angle with its respective abutting surface, a backing face spaced from its respective abutting surface, and a retention lip adjacent to the backing face overhanging at least a portion of the ring groove. Within the ring groove there is placed a sealing ring having a base lying flat and continuously peripherally against the base face, an abutment adjacent to the backing face and retention lip, and a wedge face intersecting the base in such a manner as to form with it a wedge to wedge against the base face and the opposed abutting surface. A land member is formed adjacent to the wedge surface which in its relaxed condition projects beyond the wedge face so that it will be deflected into an adjoining groove when the two abutting surfaces are brought against one another. The differential pressure will force the base of the sealing ring against the base face of the groove to make a peripheral seal, and will press the abutment so as to force the wedge toward the intersection of the base face with the abutting surfaces. The differential pressure also loads the land member toward the opposed abutting surface. The seal is therefore fully effective.

---

This invention relates to a seal for a tubing joint.

It is an increasingly necessary function of seals to form a seal whose reliability increases with the differential pressure, and which requires only minimal mechanical force to create a reliable seal. The seal of this invention accomplishes these functions.

A seal according to this invention is intended to form a peripheral fluid seal between two abutting surfaces which extend peripherally around a pair of aligned passages. The seal comprises a ring groove in one of the abutting surfaces defined by a base face intersecting at an angle with its respective surface, a backing face spaced from its respective abutting surface and intersecting the base face, and a retention lip overhanging at least a portion of the ring groove.

A sealing ring is seated in the ring groove which has a base lying flat and continuously against the base face. An abutment is formed adjacent to the backing face and retention lip. A wedge face intersects the base and forms an angle substantially equal to that of the abutting surfaces so as to bear against an opposed one of said surfaces. A land member adjacent to the wedge face projects beyond the same in its relaxed condition, and is bounded by a first and a second groove. The first groove is sufficiently wide to receive the land member when it is deflected therein by contact with one of the abutting surfaces when the abutting surfaces are brought against each other. The sealing ring is made of a resilient material, whereby when differential pressure is applied with the abutment facing toward the region of higher pressure, and the land member deflected toward it, a force is exerted to load the land member against one of the abutting surfaces, to load the base against the base face, and to force the wedge toward the base face and toward the opposed abutting surface.

Means is provided to pull the bodies axially together. In the preferred embodiment the means comprises a nut engaged to one body and a thread to the other.

The above and other features of this invention will be fully understood from the following description and the accompanying drawings, in which.

Figure 1:
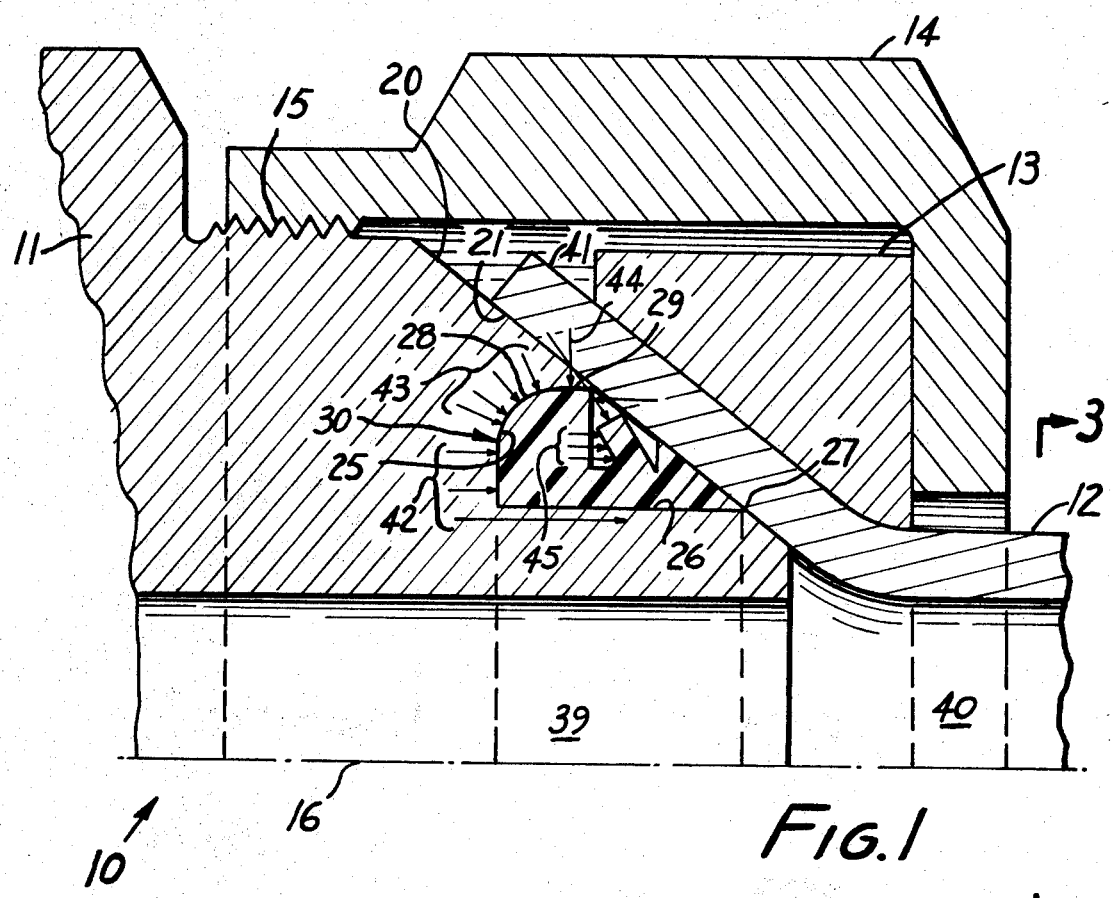
FIG. 1 is an axial partial cross section of the presently preferred embodiment of the invention.

FIG. 1 shows a tubing joint 10 according to the invention, in which a pair of bodies 11, 12, namely two tubing segments, are joined together in abutment. They are preferably held assembled by conventional means such as a backing ring 13, a nut 14 engaging the backing ring, and a thread 15 engaged by the nut. This will hold the bodies axially together relative to axis 16.

The seal is made between a pair of abutting surfaces 20, 21 which will conventionally be frustoconical, although they could take other shapes of surfaces of revolution if preferred, even being abutting planar surfaces. However, the joint as shown is a conventional one known throughout the industry.

The seal is made at a ring groove 25 which is defined by a group of surfaces, the first being a base face 26 which makes an angle with its respective abutting surface 20, so as to intersect at a circular edge 27. Conveniently, this base face may be cylindrical. Adjacent to the base face is a backing face 28 which curves toward its respective abutting surface 20. Adjacent thereto and overhanging a portion of the ring groove is a retention lip 29. The retention lip terminates at abutting surface 20.

A sealing ring 30 is seated in the ring groove. It includes a base 31 which matches and abuts base face 26, an abutment 32 with a bounding surface 33 which generally follows the contour of the backing face and the retention lip as far as the edge of the retention lip, thereby to enable the retention lip to hold the sealing ring in the ring groove. A tight fit between the bounding surface and the backing face and the retention lip is not necessary to the invention.

Figure 2:
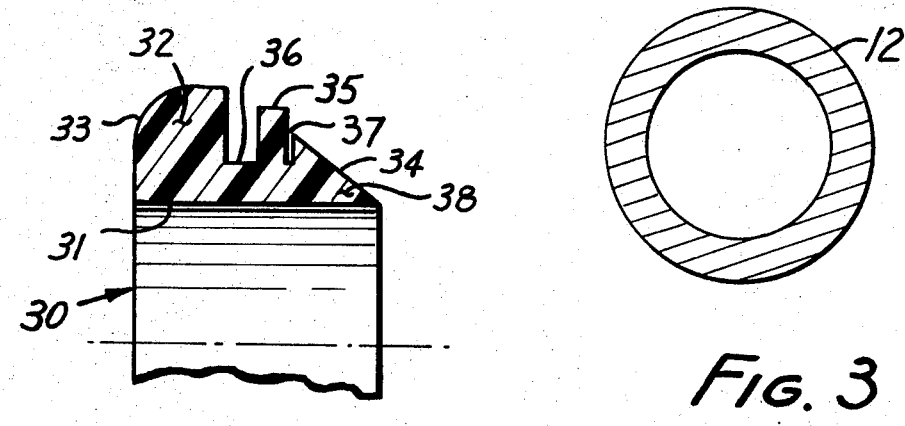
FIG. 2 is a fragmentary cross-section of a portion of the device of FIG. 1 in its relaxed condition.
Figure 3:
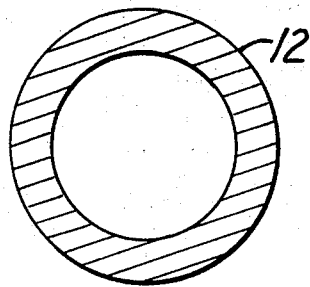
FIG. 3 is a cross-section taken at lines 3—3 of FIG. 1.

The sealing ring further includes, at its face adjacent to the abutting surfaces, a wedge face 34 which has a conical angle matching that of abutting surface 21. Adjacent to it is a land member 35. The land member in its relaxed condition as shown in FIG. 2 is spaced from the abutment by a first groove 36 and from the wedge face by a second groove 37. The second groove may be merely a slit. Its primary purpose is to form the land. However, it may also serve to space the land member from the wedge should that be desirable. Groove 36 is wide enough and deep enough to receive the land member when the abutting surfaces are brought together (see FIG. 1).

The sealing ring is made of a resilient material, and preferably one which will retain its resilience over a wide temperature range, such as a fluoroelastomer. Convenient substances for this use are Kel-F and Teflon, which are fluorinated hydrocarbons. The requisite property of the material is that it retain its resilience throughout the temperature range of the intended use.

The sealing ring is a body of revolution, and the surfaces defining the ring groove and the abutting surfaces are surfaces of revolution all coaxial around axis 16. The base and the base face will form an angle with the abutting surfaces, and the wedge face will lie against one of the abutting surfaces thereby forming a wedge 38 at the tip of the sealing ring adjacent to the outer edge of the ring groove.

This seal is intended to form a peripheral seal against a differential pressure exerted between a higher pressure in one region and a lower pressure in another region, one of the regions being the passages 39, 40 inside the bodies and the other being the region outside the bodies. The application shown is useful for sealing a vacuum within the passages, and is also useful in situations such as are likely to be found in oceanographic work where a large hydrostatic pressure is exerted outside the tubing, and atmospheric pressure may be inside. The sealing action in these cases is against a positive differential pressure from outside the tubing, and the abutment will lie closer to the higher pressure outside of the bodies than the wedge.

Should the differential pressure be reversed, with the higher pressure inside, the ring groove and sealing ring will be reversed, and the abutment will be closer to the passages than the wedge. Of course, the ring is not directly reversible, but the same construction modified for the reversal can be made conveniently.

The operation of this device will be appreciated from FIG. 1 where the joint is shown in its assembled condition utilizing the nut and thread as means to hold the device assembled. The abuting surfaces will be brought flush against each other, but it will be understood that without a further seal, there could be leakage between them. The sealing ring prevents this leakage, and when it is installed as shown, the land member is deflected into the first groove. Its mechanical resilience causes it to bear against abutting surface 21. Surface 21 may conveniently comprise the end of a common flare 41 on one of the tubes.

Now, when positive differential pressure is exerted from the outside, force components illustrated by various arrows are exerted on the sealing ring. One resultant axial force shown by arrows 42 will press the wedge face against the abutting surface 21. Forces indicated by arrows 43 will have components tending to assist in that direction and will also have a component forcing the base of the ring against the base face. Other forces 44 force the abutment toward axis 16 in FIG. 1 so as to contribute to the pressure of the base against the base face. There is thus obtained a positive force of the wedge face against abutting surface 21, and a loaded peripheral seal between the base and the base face, the reliability of which increases with pressure.

Similarly, arrows 45 indicate a force which is derived from leakage past the outer parts of the abutting surfaces which tends to force the land member against abutting surface 21, thereby increasing its sealing action with increasing differential pressure.

It will thereby be seen that there is an initial sealing action at no differential pressure, which is derived in part from mechanical wedging action obtained with the wedge, the wedge face forcing the base against the base face, and also from the deflection of the land member. Then, with application of differential pressure there is an increase in the forces as indicated by the force arrows.

The ring groove is easily machined in the end of a tubing and the sealing ring is readily machined or otherwise formed. The device is simple and reliable. Light assembly forces give a highly effective seal, and increasing differential forces give an even more reliable sealing action.

I claim:

1. A seal for a tubing joint between two bodies having abutting surfaces extending peripherally around aligned passages, the seal being made against a differential pressure from a region of higher to a region of lower pressure, one of said regions being the said passages, and the other being the outside of the bodies, said seal comprising: a ring groove in one of said abutting surfaces formed by a base face intersecting at an angle with its respective abutting surface, a backing face spaced from its respective abutting surface, and intersecting the base face, and a retention lip adjacent to the backing face overhanging at least a portion of said ring groove; and a sealing ring in said ring groove having a base lying flat and continuously against the base face, an abutment adjacent to the backing face and retention lip, a wedge face intersecting the base and forming a conical angle substantially equal to that of the abutting surfaces, so as to form with the base face a wedge which wedges against the base face and the opposed abutting surface, a land member adjacent to the wedge face which in its relaxed condition projects beyond the same, and bounded by a first and a second groove, the first groove being sufficiently wide to receive the land member when it is deflected therein by contact with one of said abutting surfaces when the abutting surfaces are brought against each other and means to pull the bodies axially together, the sealing ring being made of a resilient material, whereby, when the said differential pressure is applied with the abutment facing toward the region of higher pressure and the land member deflected toward the abutment, a force is exerted to force the land member against one of said abutting surfaces, to force the base against the base face, and to force the wedge toward the intersection of the base face with the abutting surfaces, thereby fully to seal the joint, the ring groove and abutting surfaces being surfaces of revolution and the sealing ring being a body of revolution, all having a common axis, and all being coaxial around said axis.

2. A seal according to claim 1 in which the said means comprises a nut engaged to one body and a thread engaged to the other.

3. A seal according to claim 1 in which the sealing ring is a fluoroelastomer.

4. A seal according to claim 1 in which the sealing ring is Teflon.

5. A seal according to claim 1 in which the abutting surfaces are frustoconical.

6. A seal according to claim 5 in which the said means comprises a nut engaged to one body and a thread engaged to the other.

References Cited

UNITED STATES PATENTS

| 2,131,552 | 9/1938 | DeLin | 285—332.3 |
| 3,258,279 | 6/1966 | Johnsen | 285—110 |
| 3,315,970 | 4/1967 | Holloway | 285—111 X |

FOREIGN PATENTS

| 569,311 | 1/1959 | Canada. |
| 608,557 | 1/1935 | Germany. |
| 913,421 | 12/1962 | Great Britain. |
| 456,275 | 7/1968 | Switzerland. |

DAVE W. AROLA, Primary Examiner

U.S. Cl. X.R.

277—180, 206; 285—332.3

O-1578

PO-1050
(5/69)

UNITED STATES PATENT OFFICE
CERTIFICATE OF CORRECTION

Patent No. 3,537,731      Dated November 3, 1970

Inventor(s) Robert R. Reddy

It is certified that error appears in the above-identified patent and that said Letters Patent are hereby corrected as shown below:

Column 4, line 25, after "other" insert --;--

SIGNED AND
SEALED

FEB 23 1971

(SEAL)
Attest:

Edward M. Fletcher, Jr.
Attesting Officer

WILLIAM E. SCHUYLER, JR.
Commissioner of Patents